Patented Aug. 7, 1951

2,563,516

UNITED STATES PATENT OFFICE 2,563,516

ALKYL 3-THIA-7-SILA-7,7,7-TRIALKOXY-HEPTANOATES

Charles A. Burkhard, Alplaus, N. Y., assignor to General Electric Company, a corporation of New York No Drawing. Application August 18, 1949, Serial No. 111,095

2 Claims. (Cl. 260—448.2)

The present invention relates to new chemical compounds, alkyl 3-thia-7-sila-7,7,7-trialkoxy-heptanoates having the formula $(RO)_3Si(CH_2)_3SCH_2COOR'$ wherein R and R' are lower monovalent alkyl radicals, e. g., methyl, ethyl or propyl radicals and to the preparation of such compounds.

Representative of the compounds of the present invention are:

1. Methyl 3-thia-7-sila-7,7,7,trimethoxyheptanoate $(CH_3O)_3Si(CH_2)_3SCH_2COOCH_3$ 2. Ethyl 3-thia-7-sila-7,7,7 triethoxyheptanoate $(C_2H_5O)_3Si(CH_2)_3SCH_2COOC_2H_5$ 3. Propyl 3-thia-7-sila-7,7,7 tripropoxyheptanoate $(C_3H_7O)_3Si(CH_2)_3SCH_2COOC_3H_7$ Mixed compounds in which R and R' are different alkyl radicals can also be prepared although the yields may be lower due to the possibility of an ester exchange reaction between the carboxylic acid and siliconic acid groups.

In accordance with the present invention such compounds are prepared by reacting an allyltrialkoxysilane of the formula $CH_2=CHCH_2Si(OR)_3$ wherein R is a lower alkyl radical with an alkyl thioglycolate of the formula $HSCH_2COOR'$ wherein R' is a lower alkyl radical and fractionally distilling the reaction products to recover the desired compound. The reaction appears to proceed exclusively by the addition of the S—H bond to the alkenyl radical as no sulfur is lost during the reaction and the products do not react with standard iodine solution indicating that the S—H bond has disappeared. The reaction may be represented by the equation $-CH=CH_2 + HSCH_2COOR' \rightarrow$
$\qquad -CH_2-CH_2-SCH_2COOR'$ All of the compounds are high boiling point liquids which are oil-soluble and may be employed as lubricity additives.

As all of the compounds of the invention are prepared by the same type of process, it will be sufficient to give by way of a specific example of the process the preparation of the polyethyl ester.

Example.—Ethyl 3-thia-7-sila-7,7,7-triethoxyheptanoate was prepared by mixing allyltriethoxysilane with ethyl thioglycolate in equimolar proportions or preferably with the thioglycolate in slight excess. The mixture was shaken and an exothermic reaction took place. The reaction products were subjected to fractional distillation to recover the ethyl 3-thia-7-sila-7,7,7-triethoxyheptanoate which has a boiling point of 200-201.5° C. at 50 mm. pressure. Its refractive index $n_D^{20}$ was 1.4479 and its density $d_4^{20}$ was 1.0301. Sulfur analysis gave 9.83; calculated 9.88.

Like the remaining polyalkoxy compounds of this series, the polyethyl ester can be hydrolyzed in suitable alkali or acidic solutions. For example, employing an alcoholic alkali, such as an alcoholic solution of potassium hydroxide, hydrolysis is effected with the formation of the potassium salt of both the carboxylic acid and siliconic acid groups in the form of an oily layer which separates from the alcohol. This oily layer, upon heating at 80° C. becomes a soft water-soluble solid. It acts as a soap and causes considerable foam to form on a water surface when the water is agitated. Acidification with strong acids such as hydrochloric acid, sulfuric acid, etc. of the aqueous solution causes a white, soft gel-like material to separate from solution. Upon drying, this material becomes hard and brittle and appears to be sand-like when broken. It dissolves with great ease in aqueous alkali to form a clear solution. The addition of carbon dioxide to an aqueous alkaline solution of the potassium salt causes a gel to form. This gel results from the formation of silanol groups and their subsequent condensation to siloxanes. The potassium carboxylate group is still present as such.

What I claim as new and desire to secure by Letters Patent of the United States is:

1. A compound of the formula $(RO)_3Si(CH_2)_3SCH_2COOR'$ wherein R and R' are lower monovalent alkyl radicals.

2. Ethyl 3-thia-7-sila-7,7,7-triethoxyheptanoate.

CHARLES A. BURKHARD.

REFERENCES CITED

The following references are of record in the file of this patent:

UNITED STATES PATENTS

| Number | Name | Date |
| --- | --- | --- |
| 2,352,435 | Hoeffelman | June 27, 1944 |

OTHER REFERENCES

Larsson: "Svensk Kem. Tid.," vol. 60 (1948), pages 178-80.

Burkhard et al.: "Chemical Reviews," vol. 41 (1947), page 122.